Oct. 2, 1934.  W. N. BOOTH  1,975,221
WHEEL
Filed July 15, 1929   2 Sheets-Sheet 1
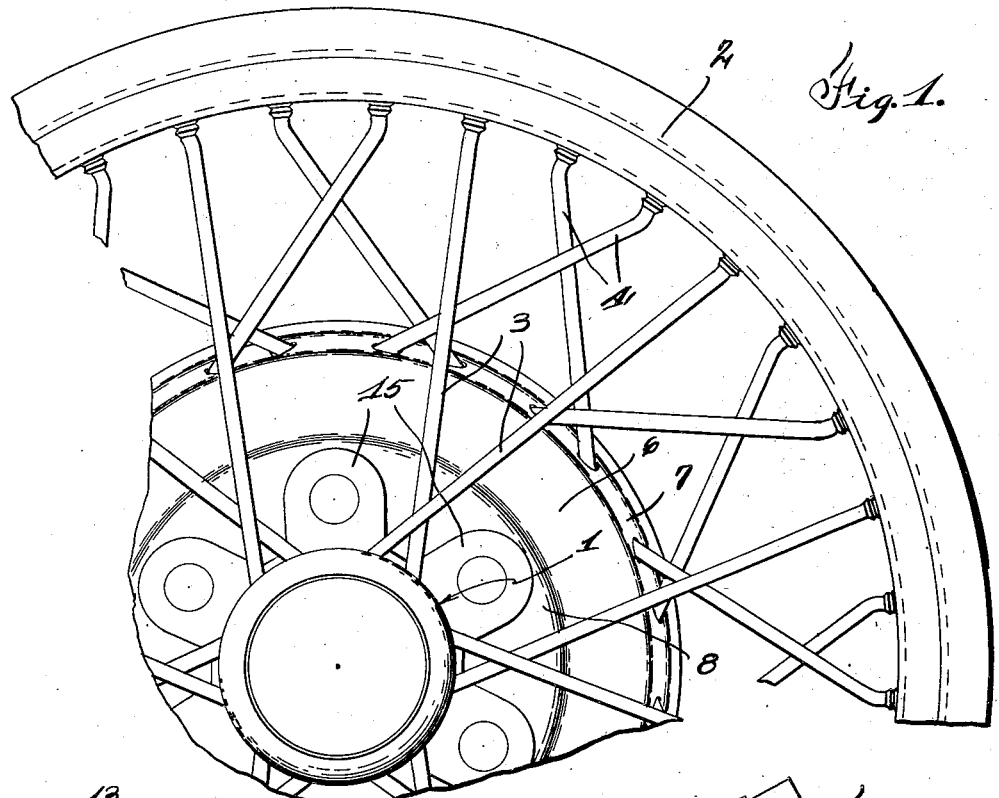
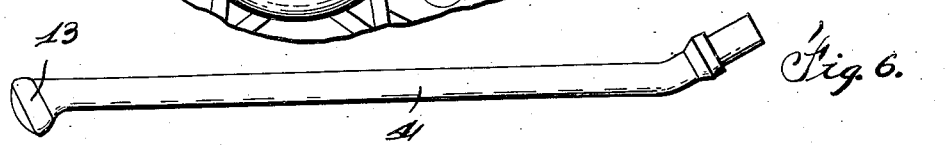
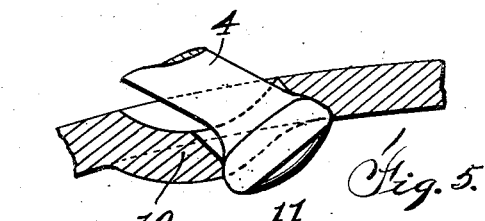
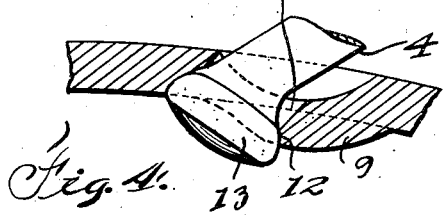
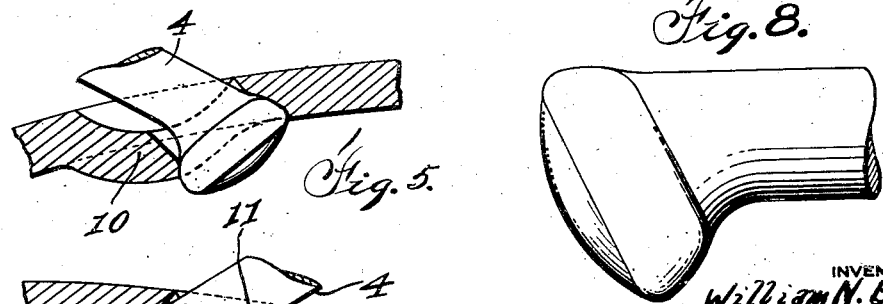
INVENTOR
William N. Booth
BY Whittemore Hulbert
Whittemore and Belknap
ATTORNEYS Oct. 2, 1934.  W. N. BOOTH  1,975,221

WHEEL

Filed July 15, 1929  2 Sheets-Sheet 2

INVENTOR
William N. Booth
BY Whittemore Hulbert
Whittemore and Belknap
ATTORNEYS Patented Oct. 2, 1934

1,975,221

UNITED STATES PATENT OFFICE 1,975,221

WHEEL

William N. Booth, Detroit, Mich., assignor to Kelsey Hayes Wheel Corporation, Detroit, Mich., a corporation of New York Application July 15, 1929, Serial No. 378,428

1 Claim. (Cl. 301—55)

The invention relates to wheels and refers more particularly to wire wheels for motor vehicles.

In the manufacture of wire wheels it has been common to emboss or press portions of the hubs of the wire wheels in outward directions and to form seats for the heads of the spokes in these outwardly embossed or pressed portions. It has also been common to secure an additional member or additional members within the hubs of the wire wheels and to form seats for the spoke heads in this member or these members.

In the instances above given it has been the practice to use spokes having heads of various shapes, but these heads were formed symmetrically in respect to the bodies of the spokes when straight or to the minor or short portions of the spoke bodies when the spokes were curved so that, in effect, the axes of the spokes if straight or of the minor or short portions of the spokes if curved were coincident with the axes of their respective heads.

In the example above given where the hub is embossed or pressed outwardly, an objection is found in that a smooth or uninterrupted outer surface cannot be had, which results in rendering cleansing of the hub difficult and in decreasing the artistic value of the wire wheel. Another difficulty also arises from the danger of fracture or rupture of the embossed or pressed portions owing principally to the strain imposed on the metal. In the example above given where an additional member or additional members are secured within the hub, objections are found in that additional weight and manufacturing expense are involved.

The present invention seeks to avoid or minimize the above objections and toward that end comprehends the formation of the hub and spokes in such a manner that the outer surface of the hub presents a substantially uniform and unbroken contour and that maximum strength in the hub and spoke and in the engagement of these parts is provided. The present invention also resides in forming the hub and spokes in a manner such that the spokes may be tangential and the seats in the hub for the spoke heads are accessible to the tools for forming the seats in a commercial or quantity production. With these as well as other objects in view, the present invention resides in the novel features of construction and combinations and arrangements of parts as more fully hereinafter set forth.

A full understanding of the above invention can best be given by a description of the invention with reference to the drawings, wherein, Figure 1 is a front elevation of a wire wheel embodying my invention;

Figure 4 is a cross section on the line 4—4 of Figure 2;

Figure 5 is a cross section on the line 5—5 of Figure 3;

Figures 6 and 7 are elevations at right angles to each other of a spoke;

Figure 8 is an enlarged view of a portion of Figure 5.

Figure 2:
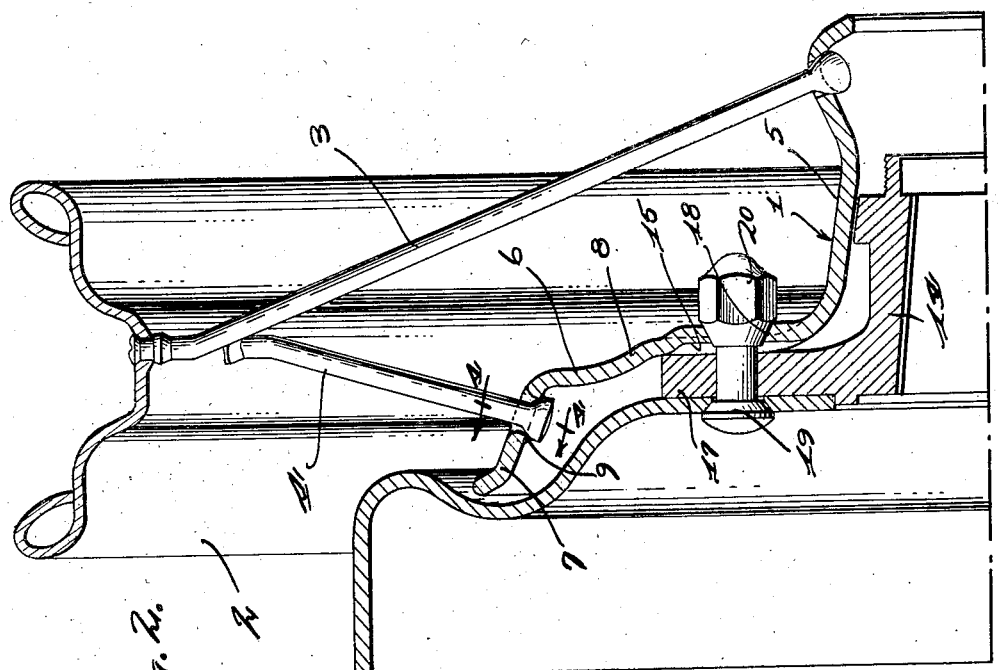
Figures 2 and 3 are cross sections therethrough.
Figure 3:
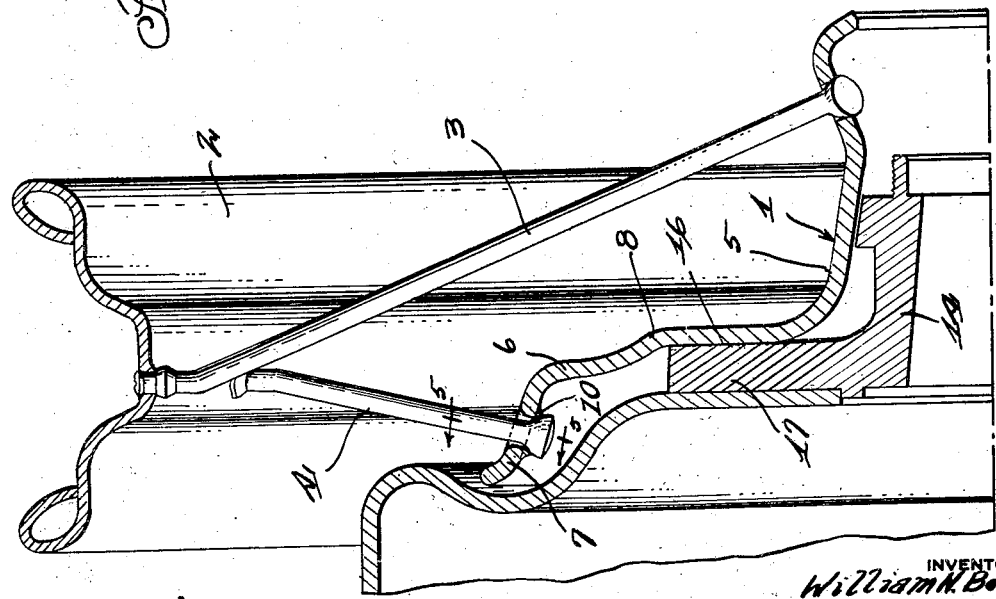

A wire wheel embodying my invention has, as shown in Figures 1, 2 and 3, the hub 1, the rim member 2 which, in the present instance, is in the nature of a sheet metal drop base tire carrying rim and the front and rear series of wire or steel spokes 3 and 4, respectively. The hub is preferably formed of sheet metal and has the front barrel portion 5 and the rear flange portion 6, the former being provided near the front end thereof with seats for the front spokes 3 and the latter being provided in its annular flange 7 with seats for the rear spokes 4. This annular flange extends rearwardly from the outer edge of the radially extending flange 8, the two flanges forming the flange portion 6. Both the front and rear series of spokes 3 and 4, respectively, are arranged in pairs with the spokes of each pair crossing and inclined relative to the median plane of the wheel and radial planes of the wheel passing through the spokes. As shown, the angles of inclination of the front spokes relative to the median plane of the wheel are greater than those of the rear spokes and the angles of inclination of the rear spokes relative to the radial planes passing through these spokes are greater than those of the front spokes.

The spoke seats in the barrel portion 5 and the flange portion 6 and the associated spokes may each embody the invention relating thereto and spoke seats and spokes of different types may be utilized. In any event, a description of the invention with respect to the spokes and their seats in the flange portion 6 will suffice.

In fashioning the hub 1, the location of the rear spokes 4 having been previously determined, portions of the annular flange 7 adjacent the points selected for the spoke seats are inwardly depressed in arcuate form peripherally of the annular flange, as shown in Figures 2, 3, 4 and 5 and indicated at 9 and 10.

The spoke openings and seats in the annular flange are similarly formed by punching and drilling and counter-sinking, or by a combination thereof, with the exception that they are formed at opposite ends of the arcuate portions depending upon the direction to be taken by their respective spokes. Therefore, the forming of but one spoke opening and seat will be described. The opening 11 and the seat 12 for a rear spoke are provided in such a manner that a substantial portion and, as shown, approximately one half of the seat is formed in the arcuate depression 9, while the remaining portion of the seat is formed in the undepressed portion of the annular flange. This seat is formed to substantially conform to the bearing surface upon the head at the inner end of a rear spoke, which will now be described.

Spoke material of the proper type having been selected, one end is swaged or upset to form the head 13, as shown particularly in Figures 4 to 8 inclusive. The head and consequently its bearing surface may be tapered convex or concave in contour, but, as shown, is convex. However, in any form the head is symmetrical about its axis, the immediately adjacent portion of the body of the spoke is symmetrical about its axis and the axis of the head is arranged at an angle to the axis of the immediately adjacent portion of the body. Also, preferably the angle and the greatest diameter of the head are such that the bearing surface of the head for engaging the portion of the seat in the undepressed portion of the annular flange extends beyond, but preferably slightly, the adjacent portion of the spoke body.

In forming the spoke head 13, as herein described, the flow of the metal in the head will be greatest toward that portion of the head the bearing surface or chord of which is at the greatest angle to the axis of the immediately adjacent portion of the body and least toward that portion of the head the bearing surface or chord of which is at the least angle to the axis of the immediately adjacent portion of the body. The distribution of the metal in that portion of the head lying between the maximum and minimum angles will vary progressively in the same degree. By reason of forming the spoke and particularly its head as above described, it will be seen from Figures 4 and 5 that that portion of the bearing surface of the spoke head at the greatest angle to the axis of the immediately adjacent portion of the spoke body and the adjacent portions of the bearing surface are brought against the portion of the seat formed in the arcuate depression. Also the arcuate depression extends from the portion of the seat formed therein in the general direction taken by the spoke when assembled and a substantial portion of the seat is formed in this arcuate depression. As a result maximum strength of the seats and surrounding portions of the hub of the spokes and particularly their heads and of the connection between these parts is secured. Further the main portion of the body of the spoke which extends from near its outer end to the head of the spoke is straight and the arcuate depression provides clearance for the portion of this body immediately adjacent the head. In addition as a result of forming the spoke and its head and the spoke seat in the hub as above described, it is commercially practicable to manufacture the wire wheel and take care of the tangential angle of inclination of the spokes which, in the present instance, is approximately 45 degrees. Approximately one half of this angle is provided for by each of the angles of the axis of the heads relative to the axes of the spokes and of the seats relative to the wheel radii passing axially therethrough. More in detail, forming of the spoke and its head is practicable commercially or in production without liability of weakening same and forming of the seat in the hub is also practicable commercially or in production, since this seat is readily accessible for operation on by suitable tools within the hub and these tools may be built substantially enough to stand up under the stresses to which they are subjected in use.

The wire wheel hub 1 may be secured to and mounted upon a wheel receiving or inner hub 14 by suitable means such as the bolts 19 secured to the fixed flange 17 of the inner hub and the nuts 20. The bolts are adapted to extend through the openings 18 in the bosses 15 and the nuts are adapted to extend into the openings.

What I claim as my invention is:

In a wire wheel, a hub member, a rim member and spokes connecting the hub and rim members, each spoke having a body inclined relative to a radial plane of the wheel passing through the body and a head at the inner end of the body, the hub member having individual inward depressed portions for the spokes and being provided with individual interior seats for the spokes formed in the depressed portions and the adjacent undepressed portions of the hub member, the depressed portions each having a part extending in the general direction and located radially inwardly of the body of its respective spoke and arranged to carry under compression the load imposed by its respective spoke.

WILLIAM N. BOOTH.